United States Patent [19]

Floessel et al.

[11] 3,790,695
[45] Feb. 5, 1974

[54] ELECTRICAL INSULATOR OF POROUS EXPANDED PLASTICS MATERIAL

[75] Inventors: Dieter Floessel, Fislisbach; Gerhard Mauthe, Wettingen, both of Switzerland

[73] Assignee: Brown Boveri & Company Limited, Baden, Switzerland

[22] Filed: Sept. 8, 1972

[21] Appl. No.: 287,288

[30] Foreign Application Priority Data
Oct. 29, 1971  Switzerland.................... 15795/71

[52] U.S. Cl. ............... 174/28, 174/16 B, 174/99 B, 174/110 F
[51] Int. Cl. .................... H01b 9/06, H01b 9/04
[58] Field of Search.. 174/25 G, 28, 29, 16 B, 99 B, 174/110 F

[56] References Cited
UNITED STATES PATENTS

| | | | |
|---|---|---|---|
| 2,216,010 | 9/1940 | Hobart | 174/28 |
| 3,684,816 | 8/1972 | Reighter | 174/110 F X |
| 3,569,611 | 3/1971 | Berends | 174/110 F X |
| 2,670,462 | 2/1954 | Linder | 174/28 X |
| 2,782,251 | 2/1957 | Ebel et al. | 174/110 F X |
| 2,556,224 | 6/1951 | Scott | 174/28 X |

Primary Examiner—Bernard A. Gilheany
Assistant Examiner—A. T. Grimley
Attorney, Agent, or Firm—Pierce, Scheffler & Parker

[57] ABSTRACT

An electrical insulator of porous expanded plastics material such as polyurethane for use within metal-clad high-voltage switchgear and lines and which are evacuated prior to being filled with a high-grade compressed insulating gas such as $SF_6$ having an insulating capacity greater than that of air. Approximately 100 percent of the pores of the expanded plastics material are open pores so as to prevent destruction of the pores during the evacuation phase and thereafter enable the pores to be filled with the insulating gas while in the normal operating condition of the electrical apparatus. If desired, the pores adjacent certain surface zones may be closed so as to reduce the risk of contamination and facilitate cleaning.

3 Claims, 1 Drawing Figure

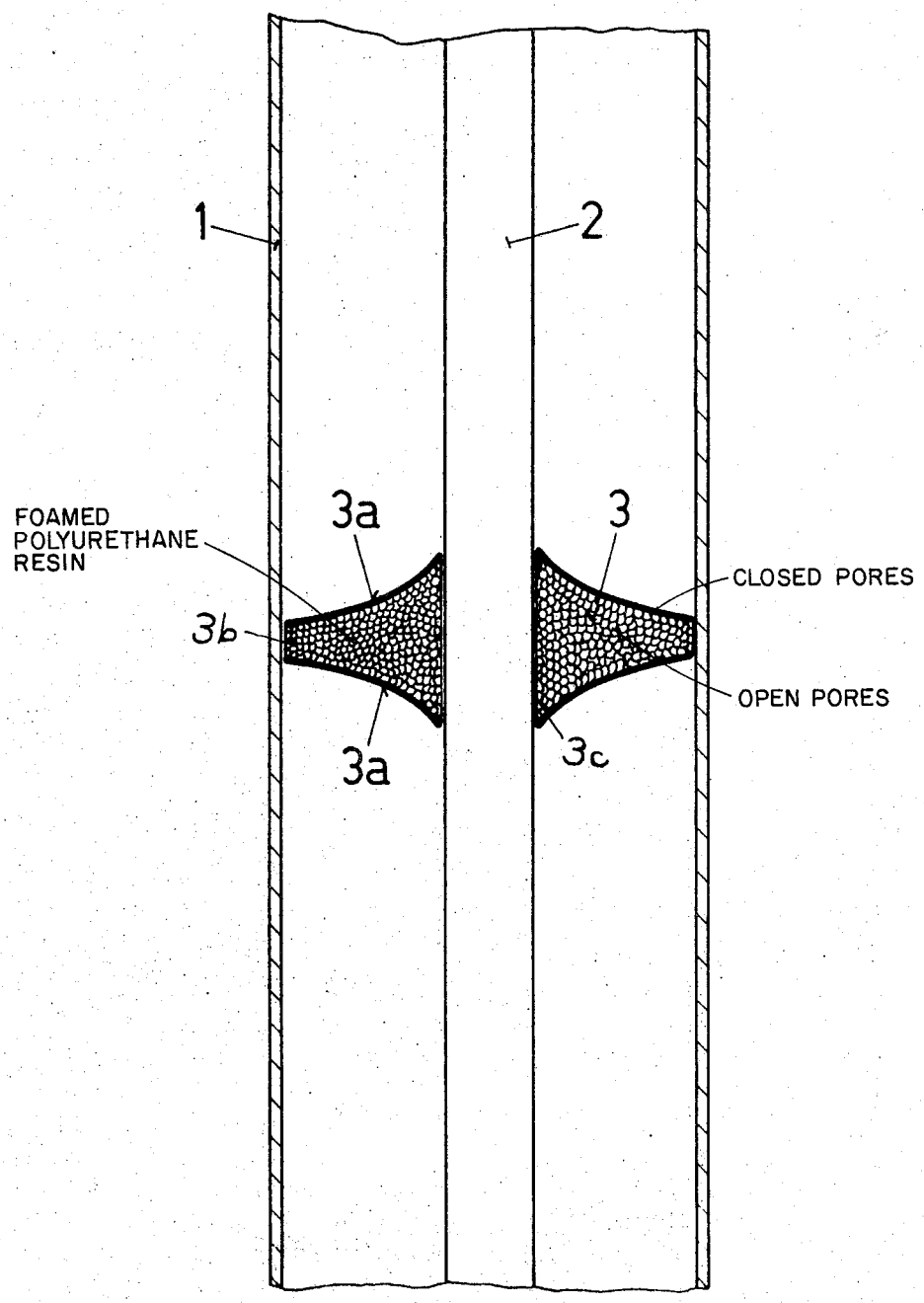

ELECTRICAL INSULATOR OF POROUS EXPANDED PLASTICS MATERIAL

The present invention relates to an improved electrical insulator of porous expanded plastics material for use in spaces which are evacuated before being filled with a high-grade compressed insulating gas having an insulating capacity greater than that of air, in particular for metal-clad i.e. encapsulated high-voltage switchgear and lines.

Expanded plastics materials, the pores of which are filled with insulating gas are known to be used in the electrical engineering field. For example, closed-pore expanded plastic is known where the material is expanded in an electrically negative gas, e.g. $SF_6$, with the result that the closed pores are filled with this electrically high-grade gas instead of with air. The procedure is also known whereby insulating inserts in the form of conical insulators of open-pore expanded plastic, the pores of which are filled with oil, are fitted at the junction between two cast-resin-insulated line sections. This procedure is described in further detail in the published German patent specification DT-AS 1,185,700. In this way a jointing material is obtained which in terms of electrical strength is well matched in the cast-resin insulation.

As expanded plastics material of which the pores are filled with insulating fluid, e.g. oil, is not suitable for use in metal-clad spaces, such as high-voltage switchgear or lines, which for reasons of electrical insulation are filled with a high-grade compressed gas, e.g. $SF_6$, the compressed insulating gas being under a relatively high pressure of some atmospheres, and where the spaces have to be evacuated before being filled with the insulating gas. In the case of expanded plastics having predominantly closed, gas-filled pores, there is the difficulty that the pressure of the gas enclosed in the pores must, on the one hand, not be too high (although a high pressure is desirable) so that before fitting and especially during evacuation, the pores do not split, thus allowing the gas to escape. On the other hand, the pressure of the insulating gas in the space surrounding the insulator must in turn not be appreciably higher than the pressure in the pores (although a high pressure in the surrounding space is desirable), since the structure of the insulator body would then collapse. This dilemma is solved by the present invention in that approximately one hundred per cent of the pores of the expanded plastics material are open pores, thus preventing destruction of the pores during evacuation, while in the normal operating condition the pores are filled with the high-grade, compressed insulating gas. In this manner the insulator body acquires an electrical strength which is at least equal to that of the space, filled with compressed insulating gas, surrounding the insulator.

The foregoing as well as other objects and advantages inherent in the improved electrical insulator structure will become more apparent from the following detailed description of one suitable embodiment thereof and the accompanying drawing, the single figure of which illustrates, in longitudinal central section, a portion of an electrical conductor located within a cylindrical casing and which is supported co-axially therein by means of a plurality of longitudinally spaced disc-type insulators made pursuant to the invention, only one of which is shown in order to simplify the drawing.

With reference now to the drawing, the cylindrical casing 1 enclosing and supporting the electrical conductor 2 and which is filled with compressed insulating gas such as $SF_6$ constitutes a metal-clad high-voltage transmission line. The conductor 2 is supported co-axially within its cylindrical casing 1 by means of a plurality of longitudinally spaced, axially cored, disc-shaped insulators 3 through which the conductor 2 passes, only one of which has been depicted. The casing 1 is filled, for example, with $SF_6$ at 4 $kg/cm^2$ abs which, for a given service voltage, allows a relatively small clearance to be maintained between the casing and the conductor. The insulator 3 is of open-pore expanded plastics material from the pores of which the gas employed for expansion has been removed during evacuation of the casing so that when the casing is filled with the compressed insulating gas ($SF_6$), this gas penetrates into the pores, filling them in the normal operating condition. Because approximately one hundred per cent of the pores of the insulator 3 are in the form of open pores, insulator 3 acqires a high dielectric strength which is at least equal to, if not slightly higher than, that of the gas space surrounding insulator 3. The material of the insulator 3 is preferably expanded polyurethane. With a view to reducing the risk of contamination, and making cleaning easier, it is recommended that the curved side surface parts 3a should be made such that the pores at such surface parts are closed. The pores at the outer and inner cylindrical surfaces 3b, 3c of the insulator 3, i.e. where it is in contact respectively with the casing 1 and the conductor 2, remain open so that the compressed gas can enter the pores at these areas during filling, and the original gas can escape during evacuation. Thus, except for the minor volume taken by the curved surface zones 3a indicated on the drawing by the solid lines, the entire remainder of the volume of the insulator body is constituted by an open-pore structure.

We claim:

1. A high-voltage electrical member mounted within and spaced from a pressurized insulation gas-filled metallic casing by an expanded polyurethane insulating member having an approximately 100 percent open-pore structure, said insulating member forming a stable support for said electrical member both during evacuation of said casing for the removal of air and subsequent filling with the pressurized insulating gas.

2. The invention as defined in claim 1 wherein certain surface portions of said insulating member are characterized by closed pores thus to reduce the risk of contamination and facilitate cleaning thereof.

3. The invention as defined in claim 1 wherein said insulating member has a disc-shaped annular configuration within which said electrical member in the form of a conductor is supported and spaced from said metallic casing which has a cylindrical configuration, the side surface portions of said insulator member being characterized by closed pores thus to reduce risk of contamination and facilitate cleaning thereof whereas the pores at the outer and inner cylindrical surfaces in contact with the inner wall of said casing and said electrical conductor respectively are open thereby to permit entry of the pressurized insulating gas which fills said casing.

* * * * *